United States Patent [19]
Broadway et al.

[11] 3,949,253
[45] Apr. 6, 1976

[54] ELECTRIC MOTORS

[75] Inventors: Alexander Richard William Broadway; William Fong; Gordon Hindle Rawcliffe, all of Bristol, England

[73] Assignee: National Research Development Corporation, England

[22] Filed: June 24, 1974

[21] Appl. No.: 482,500

[30] Foreign Application Priority Data
July 5, 1973 United Kingdom............... 31974/73

[52] U.S. Cl. ................. 310/184; 310/198; 310/203
[51] Int. Cl.² ........................................... H02K 3/00
[58] Field of Search ........... 310/179, 180, 184, 195, 310/198, 185, 200–208; 321/30; 318/224, 225, 224 A; 322/63–65

[56] References Cited
UNITED STATES PATENTS

| | | | |
|---|---|---|---|
| 2,989,654 | 6/1961 | Neyhouse | 310/204 |
| 3,230,434 | 1/1966 | Bauerlein | 310/207 |
| 3,233,159 | 1/1966 | Rawcliffe | 318/224 |
| 3,299,337 | 1/1967 | Rawcliffe | 318/224 |
| 3,335,307 | 8/1967 | Levy | 310/202 |
| 3,432,707 | 3/1969 | Peters | 310/180 |
| 3,515,922 | 6/1970 | Fong | 310/198 |
| 3,673,477 | 6/1972 | Broadway | 310/202 |

*Primary Examiner*—R. Skudy
*Attorney, Agent, or Firm*—Larson, Taylor and Hinds

[57] ABSTRACT

A 3-phase, alternating current electric motor or generator having a stator winding comprising three phase-windings in start-connection wound on a stator having a slot-number not divisible by "3", yet providing a substantially balanced 3-phase winding. The stator winding coils are disposed to provide a high positive-sequence distribution factor and a low negative-sequence distribution factor. This is achieved with two of the phase-windings having an equal number of coils to each other, the third phase-winding having a different number.

9 Claims, 3 Drawing Figures

ELECTRIC MOTORS

This invention relates to 3-phase, alternating current electric motors and generators.

The object of the invention is to provide 3-phase windings suitable for a stator having a non-triplen number of slots, that is, a slot-number not divisible by "3."

It is well-known that an unbalanced 3-phase current system can be analysed into three separate balanced current systems; that is, into positive-sequence; negative-sequence; and zero-sequence systems. It is also true, but not so well recognised, that a similar analysis can be applied to the space-distribution of an unbalanced 3-phase winding.

However, it has not hitherto been recognised that even large zero-sequence winding components are fully acceptable in star-connected windings.

It has hitherto been assumed that a balanced 3-phase winding could only be wound in a stator with a triplen slot-number, that is a slot-number which is a multiple of 3. For all practical purposes, this assumption is now shown not to be true. It is possible in practice to use many slot-numbers which are not multiples of 3, for winding 3-phase balanced windings, subject to certain conditions explained herein.

In general, when there is complete freedom of design, it may be preferred to use triplen slot-numbers for 3-phase windings. However, a factory which chiefly makes small single-phase windings may need to make occasional 3-phase windings in punchings which are available, but which were designed for single-phase use and in which the slot-number is not a multiple of 3. In such context particularly, the methods and windings of the present invention have great value.

The practical value of the present invention is confirmed by the fact that there have been a number of previous attempts to provide such windings. The earlier proposals have in general been based on various ad hoc constructions, and have often required the use of unequal, or divided, coils or coil-groups.

The present invention provides a 3-phase, alternating current, motor or generator having a 3-phase winding comprising three phase-windings for connection together in star-connection wound on a stator having a number of slots not divisible by 3, two of the phase-windings having a number of coils equal to each other and the third phase-winding having a number of coils unequal to the two said phase-windings, the spatial distribution of the coils on the stator being arranged to provide a high positive-sequence distribution factor and a low negative-sequence distribution factor. A 3-phase winding, on a non-triplen slotted stator, as above defined, will have a third phase-winding with its coil-number differing from that of the first two phase-windings by one coil or by two coils, only. It is preferred, but not essential, that the coil-number particularly of the third phase-winding is integrally divisible by the machine pole-number, so that each pole may comprise the same number of coils.

In order that the invention may be readily carried into practice, the principle of the invention and practical embodiments thereof will now be described in detail, the embodiments being by way of example, with reference to the accompanying drawings, in which.

The principle of the invention is achieved by designing a 3-phase winding which has a high positive-sequence (fundamental) distribution factor and a very small, or nil negative-sequence distribution factor, accepting whatever zero-sequence distribution factor arises in consequence. The zero-sequence distribution factor can be ignored in star-connection, which is the connection of the phase-windings used in machines according to the invention. Delta connection is not used. In practice, star-connection is preferred also on other grounds.

The method of the invention and a winding according to the invention will be exemplified by a 4-pole 3-phase winding in 32 slots.

It is desirable in such a winding to divide the coils of the total winding as equally as possible between all three phases and exactly equally between two of the phases. For a 32-slot stator, there are two obvious possibilities for division, namely: 10, 11, 11, or 12, 10, 10, for phases A, B and C, respectively. For reasons which are dealt with later herein, even numbers of slots per phase are more acceptable than odd numbers, and the example described herein in detail is for 12, 10, 10, coils per phase.

Figure 1:
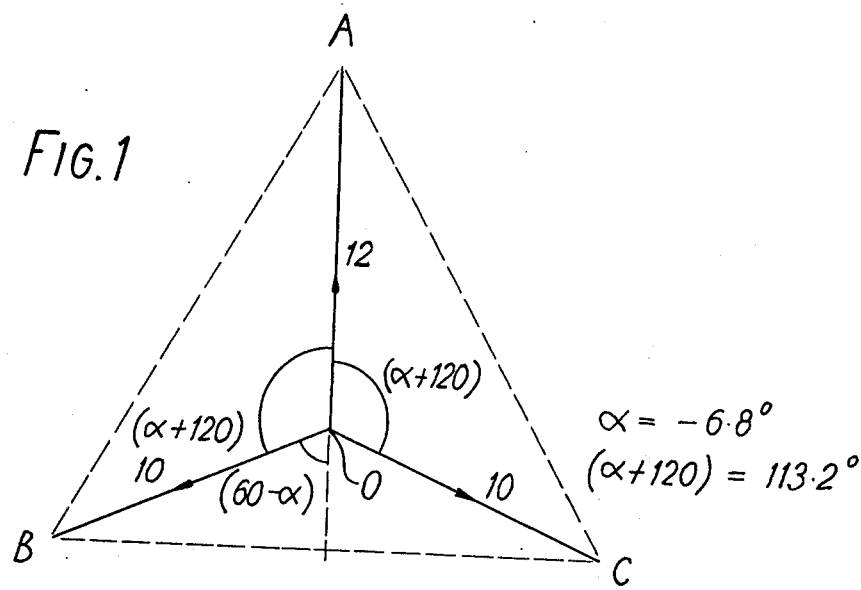
FIG. 1 is a vector diagram referred to in the explanation of the invention.

Referring now to FIG. 1, consider three vectors of relative length: 12, 10 and 10, at the relative angles shown in the diagram of FIG. 1, which are near to, but differing from the equi-angular separation of 120°. The angles AOB and AOC are the same, and each is equal to $(\alpha + 120)$, where $\alpha$ is the angle of difference and is normally only a small angle.

Applying the normal theory of symmetrical components to these vectors, the condition for a nil negative-sequence component is that:

$$12 = 2 \times [10] \times \cos [60 + \alpha] \qquad (1)$$

Hence:
$$\cos [60 + \alpha] = 0.6$$
$$(60 + \alpha) = 53.2°$$
$$\alpha = -6.8°$$
Hence: $(\alpha + 120) = 113.2°$ In order to meet the ideal condition, therefore, it is necessary to make $A = 12$; $B = 10$; and the angles $AOB = AOC = 113.2°$, as shown in FIG. 1. However favourably the coils are distributed, there will be distribution factors to be applied to the quantities 12, 10 and 10. However, this factor will be nearly unity, and is likely to be nearly the same (though not quite) for all the three quantities 12, 10 and 10. The error involved in ignoring this factor, in relation to the equation (1) above, is therefore trivial.

Figure 3:
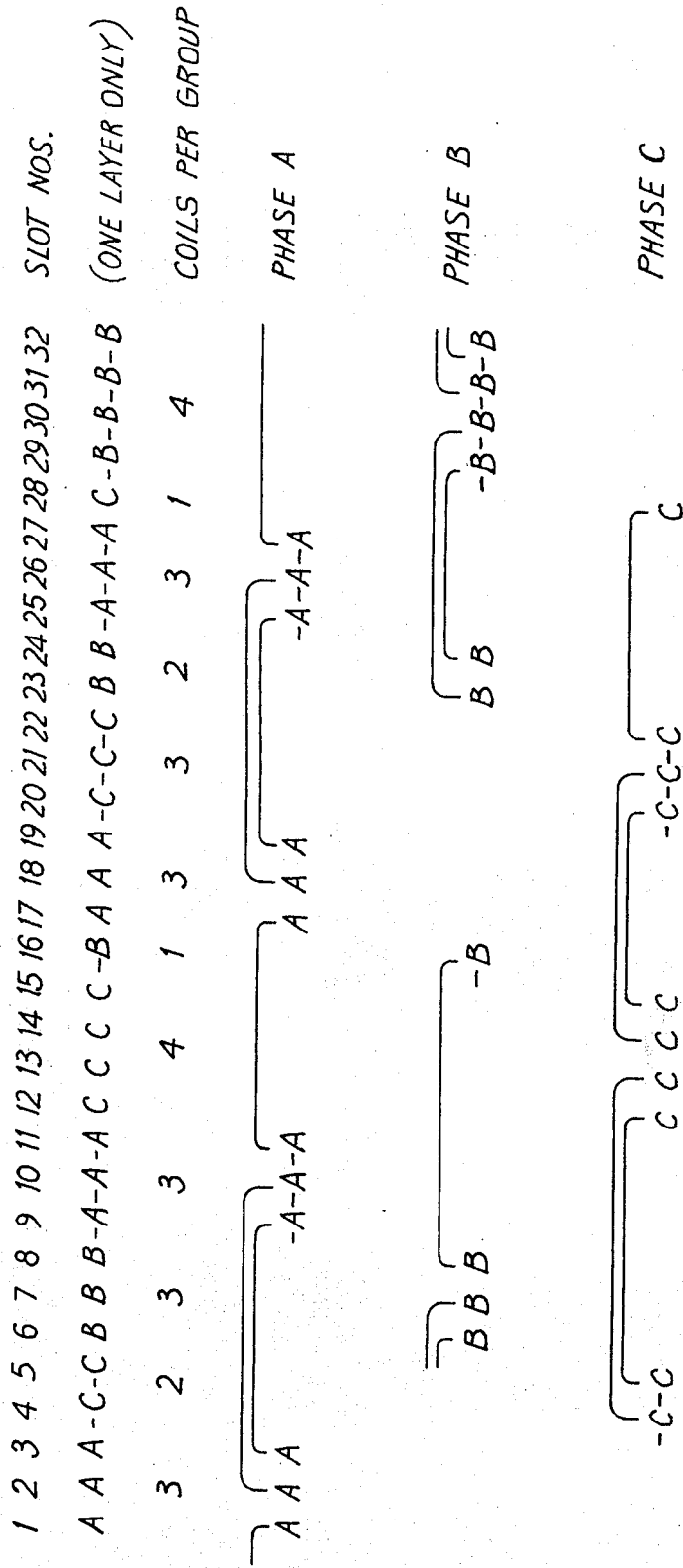
FIG. 3 is a winding diagram of a sequence-selective balanced 4-pole, 3-phase winding in a 32-slot stator.

Referring next to FIG. 3, which is a winding diagram wherein the stator slot-numbers are shown in sequence at the head of the diagram, the layout of the coils in each phase-winding is shown in the three lines referenced: Phase A, Phase B and Phase C. The second line of the diagram heading shows the coil-grouping for each phase and the third line of the diagram heading indicates the number of coils in each coil-group.

As shown in FIG. 3, the layout of the 12 coils of Phase A as four groups each of three coils, in the sequence +3 −3 +3 −3, follows logically. In order that the distribution factor for Phase A shall be as high as possible, it is desirable that these coils shall occupy slots 1–3, 9–11, 17–19 and 25–27, respectively.

This therefore leads to the conclusion that the four pairs of coil-groups ± [C] ∓ [B] should be arranged 1, 4, and 4, 1 or should be arranged 2, 3 and 3, 2 in the remaining slots. Conceivably, but improbably, the arrangement 0, 5 and 5, 0 might form a third alternative arrangement.

Further, if the total numbers of coils in phases B and C are to remain equal, for each coil-group pair (for example 1, 4) there must be a corresponding inverse coil-group pair (for example 4, 1). Finally, if the numbers of positive and negative coils in each phase are to be equal, the pair on pole 3 must be the inverse pair of that on pole 1; and the pair on pole 4 must be the inverse pair of that on pole 2.

The desired arrangement of the coils of Phase A leaves a number of alternative possibilities for the allocation of the 10 coils in each of the phases B and C.

Ignoring the third alternative referred to above, these are:

| Pole 1 | Pole 2 | Pole 3 | Pole 4 |
|---|---|---|---|
| + − + | − + − | + − + | − + − |
| A C B | A C B | A C B | A C B |
| 3 2 3 | 3 3 2 | 3 3 2 | 3 2 3 |
| 3 1 4 | 3 4 1 | 3 4 1 | 3 1 4 |
| 3 2 3 | 3 1 4 | 3 3 2 | 3 4 1 |
| 3 2 3 | 3 4 1 | 3 3 2 | 3 1 4 |

The arrangments shown in the last two lines of the above table are preferred, for the reasons given later herein. These two arrangements will be seen to be the same, in reverse order. Electrically they are identical.

Each of such possible sets of coil-groups will have a corresponding vector diagram, though two sets may coincide, as they do in the present example. Plainly, both the magnitude and the direction of the resultant vectors for B and C will be affected (in a high second-order but not in the first order) by the coil-grouping.

The optimum choice is that set of coil-groups which gives the highest possible winding factor for phases B and C; together with resultant vectors which are, as nearly as possible, at an angle 113.2° to the vector for Phase A, for the reason explained with reference to FIG. 1.

Figure 2:
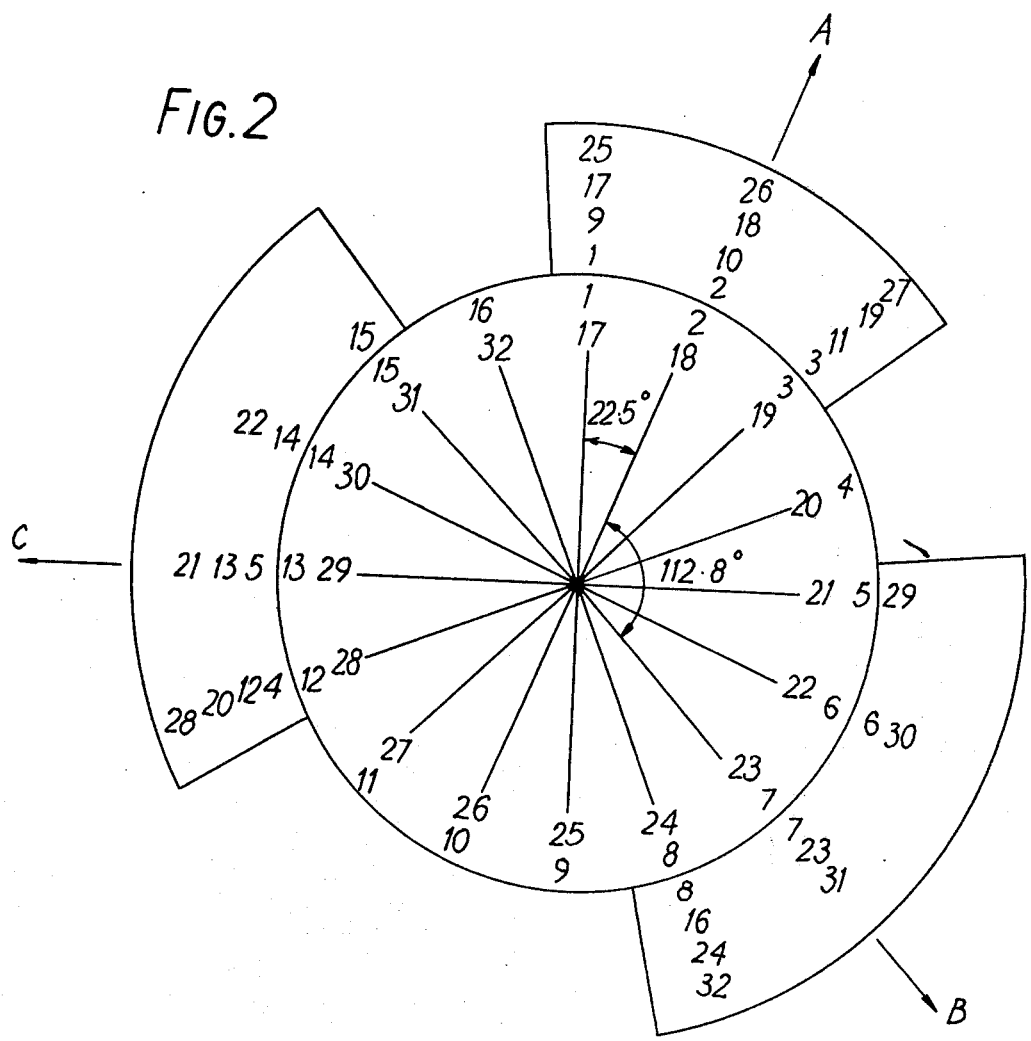
FIG. 2 is a slot-vector diagram for a sequence-sensitive 4-pole, 3-phase winding in a 32-slot stator.

Referring next to the slot-vector diagram of FIG. 2, the slot-angle for 4 poles in 32 slots is $$\left[\frac{4 \times 180}{32}\right] = 22.5°.$$

The slot vector diagrams for these options can readily be drawn, as for the diagram of FIG. 2, using 22.5° vector paper. It will then be seen that either of the alternatives shown in the last two lines of the Table above, is the best. The distribution factor for phase A is, in all cases, the same and is equal to 0.949. The factor for phases B and C for the preferred grouping is 0.926, and α = 112.8°. This is a very close approach to the ideal angle. The distribution factors differ by only 2 percent and are both high.

If the stated requirement for equal numbers of positive and negative coils were relaxed, further possibilities would arise, such as the following:

+ − + − + − + − + −
A C B A C B A C B A C B
3 2 3 3 3 2 3 1 4 3 4 1

However, these coil-groupings would be limited to double-layer windings. The slot-vector diagram for this grouping is, however, identical with that for the preferred coil-grouping discussed above with reference to FIG. 2.

An m.m.f. waveform analysis, which can be effected by computer, both for the preferred coil-grouping and for the further coil-grouping last given above, shows both waveforms to be excellent, even for the single-layer form of the preferred winding. For a double-layer winding a pitch of seven slots (winding factor = 0.912) or of eight slots (winding factor = 0.930) may be used.

The residual fundamental negative-sequence winding component is found to be 0.7 percent, which is trivial. The fundamental zero-sequence winding component is 14.1 percent. As explained earlier herein, the zero-sequence component can be totally ignored, however large, in any star-connected winding.

The unbalanced vector resultants evident in the diagram of FIG. 2 will, in fact, draw a perfectly balanced current from a 3-phase supply, with an isolated neutral point, as is the normal arrangement.

The full winding layout for the preferred case is shown in FIG. 3. In this diagram, for each coil of each coil-group for Phase A, Phase B and Phase C, there is shown the simple concentric coil arrangement into which this layout can be formed.

The example of a 4-pole winding in 32 slots is only a particular case of the general method according to the invention. Further, in the interests of simplicity, the two conditions of no divided coil-groups, and of all coils being the same, were imposed. Despite these conditions, an excellent winding is obtained.

If it were either permissible, or even obligatory, to use unequal coils, a solution according to the invention would be easier. Each case would have to be worked out on its own merits, but the principle applied is absolutely general.

What we claim is:

1. A 3-phase alternating current rotary electric machine with three phase-windings defining a pole-number and wound on a stator having a number of slots not divisible by 3; wherein two of the phase-windings each have a first number of coils and the third phase-winding has a second number of coils different from said first number; wherein the positive-sequence distribution factor of the windings is high, the negative-sequence distribution factor is low and whatever zero-sequence distribution arises is accepted; and wherein the three phase-windings are star-connected together.

2. A 3-phase machine as claimed in claim 1, in which the said first and said second numbers of coils differ by two coils.

3. A 3-phase machine as claimed in claim 1, in which the said first and said second numbers of coils differ by one coil.

4. A 3-phase machine as claimed in claim 2, in which the said second number of coils is integrally divisible by the machine pole-number.

5. A 3-phase machine as claimed in claim 3, in which the said second number of coils is integrally divisible by the machine pole-number.

6. A 3-phase alternating current rotary electric machine with three phase-windings defining a pole-number and wound on a stator having a number of slots not divisible by 3; wherein two of the phase windings each have a first number of coils and are respectively represented by vectors N1 and N2 of equal magnitude proportional to said first number; wherein the third phase winding has a second number of coils different from said first number and is represented by a vector N3 of magnitude proportional to said second number; wherein the coils are distributed on the stator such that the vector angular spacing, in the sequence N1, N3 and N2, is ($\alpha$ + 120), ($\alpha$ + 120) and (120 − 2$\alpha$), respectively, where $\alpha$ is a small angle not exceeding 10°; wherein N3 is substantially equal to $$(N1 + N2) \times \cos(60 + \alpha)$$

and wherein the three phase-windings are star-connected together.

7. A 3-phase machine as claimed in claim 6, in which said first number of coils is an even number and the said pole-number is defined by two coil-group of said two phase-windings, the first coil-group being the inverse of the second.

8. A 3-phase machine as claimed in claim 6, wherein said stator slot-number is 32, wherein said pole-number is 4, wherein said two phase-windings each have 10 coils, and wherein said third phase-winding has 12 coils.

9. A 3-phase machine as claimed in claim 8, wherein the overall coil grouping is:

3, −2,3; −3,1, −4; 3, −3,2; −3,4, −1 the first numeral in each group of three numerals defining the third said phase-winding.

* * * * *